US010971715B2

(12) United States Patent
Doi et al.

(10) Patent No.: US 10,971,715 B2
(45) Date of Patent: Apr. 6, 2021

(54) SEALED BATTERY

(71) Applicant: TOYOTA JIDOSHA KABUSHIKI KAISHA, Toyota (JP)

(72) Inventors: Takayoshi Doi, Toyota (JP); Joji Yoshimura, Toyota (JP); Toru Sugiyama, Nagakute (JP); Akinori Eda, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 129 days.

(21) Appl. No.: 16/266,331

(22) Filed: Feb. 4, 2019

(65) Prior Publication Data

US 2019/0245191 A1    Aug. 8, 2019

(30) Foreign Application Priority Data

Feb. 5, 2018  (JP) .............................. JP2018-018631

(51) Int. Cl.
*H01M 2/34*  (2006.01)
*H01M 10/42* (2006.01)
*H01M 2/12*  (2006.01)

(52) U.S. Cl.
CPC ......... *H01M 2/345* (2013.01); *H01M 2/1235* (2013.01); *H01M 10/4235* (2013.01); *H01M 2200/20* (2013.01)

(58) Field of Classification Search
CPC ...... H01M 2/345; H01M 2/1235; H01M 2/06; H01M 2/30; H01M 2/24; H01M 2/34; H01M 2/12; H01M 2/1229; H01M 2200/20; H01M 10/42; H01M 10/4235; H01M 10/0567

USPC .......................................................... 429/56
See application file for complete search history.

(56) References Cited

U.S. PATENT DOCUMENTS

| | | | | |
|---|---|---|---|---|
| 9,583,753 B2* | 2/2017 | Takahata | ........... | H01M 10/0525 |
| 9,847,550 B2* | 12/2017 | Scordilis-Kelley | ... | H01M 4/581 |
| 10,566,610 B2* | 2/2020 | Sugihara | ........... | H01M 10/0525 |
| 2002/0106554 A1* | 8/2002 | Nemoto | ................ | H01M 2/361 |
| | | | | 429/72 |
| 2011/0177398 A1* | 7/2011 | Affinito | ................ | H01M 4/405 |
| | | | | 429/325 |
| 2012/0021303 A1* | 1/2012 | Amendola | ............... | H01M 4/96 |
| | | | | 429/406 |
| 2013/0084482 A1* | 4/2013 | Chang | .................... | H01M 8/20 |
| | | | | 429/107 |

(Continued)

FOREIGN PATENT DOCUMENTS

JP    2013-157154 A    8/2013

*Primary Examiner* — Milton I Cano
*Assistant Examiner* — Suphia Quraishi
(74) *Attorney, Agent, or Firm* — Sughrue Mion, PLLC

(57) ABSTRACT

A current interrupt mechanism includes a partition wall defining a second space that is independent from a first space, and the partition wall includes a current path portion serving as a current path of a sealed battery. The current interrupt mechanism interrupts the current path in response to an internal pressure of the second space that is higher than a predetermined pressure. One conductive path passes through the current path of the current interrupt mechanism, and is in contact with the second electrolyte solution enclosed in the second space. Another conductive path includes a potential application line that is wired to the second electrolyte solution enclosed in the second space.

8 Claims, 5 Drawing Sheets

(56) References Cited

U.S. PATENT DOCUMENTS

| | | | |
|---|---|---|---|
| 2013/0196187 A1* | 8/2013 | Yokoyama | H01M 2/345 429/53 |
| 2013/0196189 A1 | 8/2013 | Minami et al. | |
| 2013/0196191 A1* | 8/2013 | Arai | H01M 2/345 429/61 |
| 2014/0332389 A1* | 11/2014 | Young | G01N 27/44717 204/612 |
| 2014/0335389 A1* | 11/2014 | Takahata | H01M 10/0525 429/61 |
| 2015/0229006 A1* | 8/2015 | Kawase | H01M 2/345 429/61 |
| 2016/0190657 A1* | 6/2016 | Hirose | H01H 35/34 429/7 |
| 2016/0233550 A1* | 8/2016 | Takahata | H01M 10/052 |
| 2016/0268626 A1* | 9/2016 | Ishida | H01M 4/587 |
| 2018/0108946 A1* | 4/2018 | Scordilis-Kelley | H01M 4/62 |
| 2018/0233722 A1* | 8/2018 | Holman | H01M 2/0212 |
| 2018/0316040 A1* | 11/2018 | Iguchi | H01M 10/049 |
| 2018/0375164 A1* | 12/2018 | Hodges | H01M 10/425 |

* cited by examiner

SEALED BATTERY

CROSS REFERENCE TO RELATED APPLICATIONS

The present application claims priority from Japanese Patent Application No. 2018-018631 filed on Feb. 5, 2018, which is incorporated by reference herein in its entirety.

BACKGROUND

The present disclosure relates to sealed batteries.

JP 2013-157154 A discloses a sealed battery including a battery case and a current interrupt mechanism for interrupting electric current when the internal pressure of the battery case becomes higher than a predetermined value. In the battery case, the current interrupt mechanism is provided in at least one of a conductive path from a positive electrode plate and a conductive path from a negative electrode plate. The non-aqueous electrolyte solution of the sealed battery disclosed in the publication contains an overcharge protection agent that generates a gas at a predetermined potential. The sealed battery is configured so that, when overcharged, the overcharge protection agent generates a gas inside the battery case. The current interrupt mechanism interrupts electric current when the pressure inside the battery case becomes higher than a predetermined value. The publication suggests that the overcharge protection agent be contained in an amount of from 3.0 volume % to 4.5 volume % with respect to the volume of the interior space of the battery case.

SUMMARY

It is required that sealed batteries, such as lithium-ion secondary batteries, should have high capacity in the use as a drive source of electric vehicles, such as plug-in hybrid electric vehicles and electric vehicles. The present inventors believe that, due to the increasing battery capacity, the battery case for sealed batteries needs to be provided with a relief valve, in addition to a safety valve. The reasons are as follows. The increasing battery capacity results in a larger amount of active material that is contained in the battery case. Accordingly, the amount of gas generated is likely to be greater even in a normal charge and discharge operation. Moreover, attempts to reduce the interior space of the battery case tend to reduce the volume of dead space in the battery case. Consequently, when a very small amount of gas generated during a normal charge and discharge operation accumulates gradually in the battery case, the internal pressure of the battery case tends to become higher. When a relief valve is provided, it is possible to keep the internal pressure at a certain level. However, the present inventors believe that the provision of a relief valve hinders activation of a current interrupt mechanism that is activated in response to an internal pressure of the battery case that is higher than a predetermined pressure.

Herein, the term "safety valve" is used to mean a valve that is designed to rupture a predetermined portion of the battery case at a predetermined pressure in the event that a large amount of gas is generated abruptly in the battery case. The safety valve ruptures a portion of the battery case at a predetermined pressure to release the gas from the interior space of the battery case. Because the safety valve ruptures a predetermined portion of the battery case, the safety valve prevents the battery case from being damaged significantly at that portion.

The term "relief valve" means another valve that is provided separately from the safety valve. The relief valve opens the battery case when, for example, the internal pressure of the battery case has increased due to the accumulation of a very small amount of gas generated during a normal charge and discharge operation. The relief valve may be configured so as to open at a pressure slightly lower than the pressure at which the safety valve is activated, and to close when the internal pressure of the battery case decreases. The activation pressure of the relief valve should preferably be set lower than the activation pressure of the safety valve. Thus, the "relief valve" is a valve that permits the battery case to open temporarily, which is distinct from the "safety valve".

Moreover, the activation pressure of the relief valve is set lower than the activation pressure of the safety valve. The activation pressure of the current interrupt mechanism that is activated in response to the internal pressure of the battery case needs to be designed to fall between the activation pressure of the relief valve and that of the safety valve. Thus, the provision of a relief valve makes provision of the current interrupt mechanism difficult.

In view of these circumstances, the present inventors believe that there is a need for a totally new current interrupt mechanism that is activated appropriately at the time when an overcharge event occurs.

A sealed battery according to the present disclosure includes an electrode assembly, a battery case, a positive electrode terminal, a first conductive path, a negative electrode terminal, a second conductive path, a partition, a first electrolyte solution, a second electrolyte solution, and a current interrupt mechanism.

The electrode assembly includes a positive-electrode current collecting portion and a negative-electrode current collecting portion. The battery case encloses the electrode assembly.

The positive electrode terminal is attached to the battery case. The first conductive path is a conductive path connecting the positive-electrode current collecting portion ad the positive electrode terminal. The negative electrode terminal is attached to the battery case. The second conductive path is a conductive path connecting the negative-electrode current collecting portion and the negative electrode terminal The partition is disposed in the battery case, and the partition divides an interior space of the battery case into a first space enclosing the electrode assembly and a second space being independent from the first space.

The first electrolyte solution is enclosed in the first space.

The second electrolyte solution is enclosed in the second space, and the second electrolyte solution contains an addition agent generating a gas when a predetermined voltage is applied to the second electrolyte solution.

The current interrupt mechanism includes a partition wall defining the second space, the partition wall including a current path portion serving as a current path of the sealed battery. The current interrupt mechanism interrupts the current path in response to an internal pressure of the second space that is higher than a predetermined pressure.

Here, one of the first conductive path and the second conductive path passes through the current path of the current interrupt mechanism, and is in contact with the second electrolyte solution enclosed in the second space. The other one of the conductive paths includes a potential application line that is wired to the second electrolyte solution of the second space.

The current interrupt mechanism is activated appropriately when a voltage that causes the addition agent to undergo a decomposition reaction is applied to the second electrolyte solution, which is enclosed in the second space independent from the first space enclosing the electrode assembly.

It is possible that the current path may include a thinned portion in a portion of the partition wall defining the second space. It is also possible that the thinned portion may be configured so that atmospheric pressure acts on a surface of the thinned portion that is opposite the second space.

It is possible that the addition agent may be contained, for example, only in the second electrolyte solution enclosed in the second space within the battery case.

It is possible that the battery case may include an outer wall defining the first space; and the outer wall may include a safety valve activated at a predetermined pressure, and a relief valve activated at an activation pressure that is lower than the predetermined pressure.

DETAILED DESCRIPTION

Figure 1:
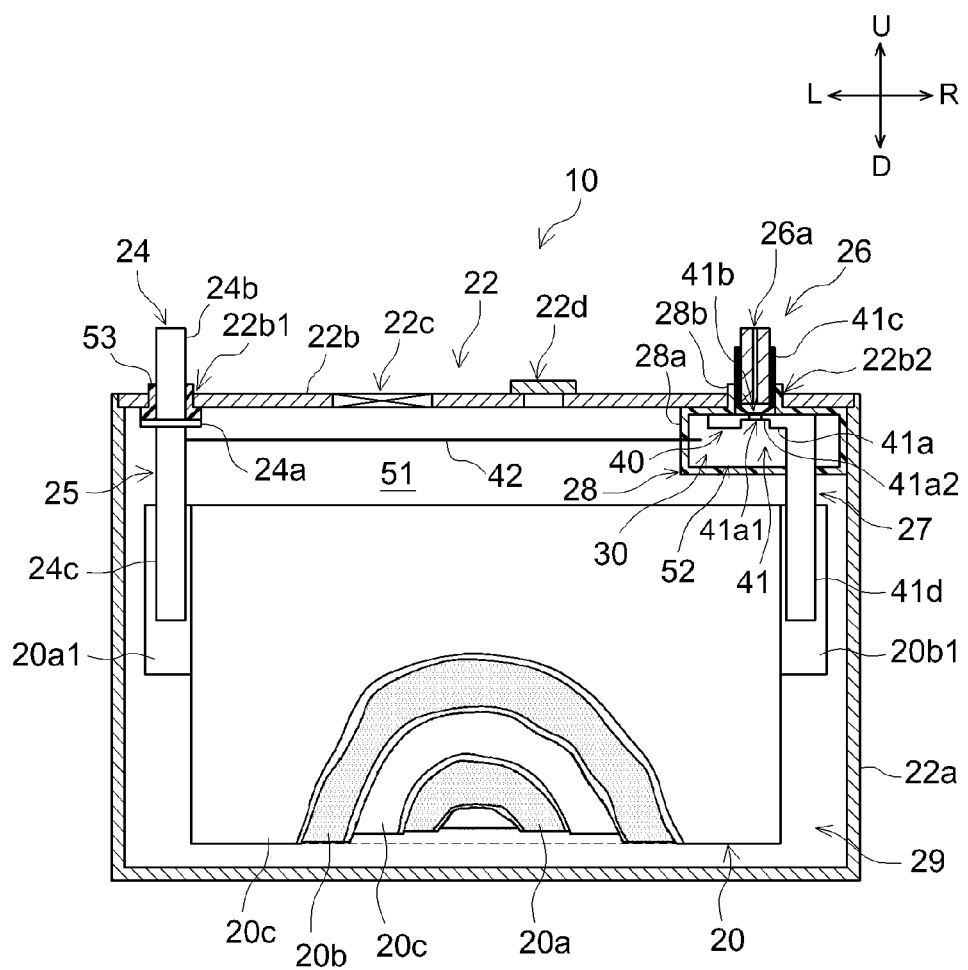
FIG. 1 is a cross-sectional view of a sealed battery 10.

The following description is given to illustrate embodiments of a sealed battery according to the present disclosure. It should be noted, however, that the embodiments described herein are, of course, not intended to limit the present invention. The present invention is not limited to the embodiments described herein unless specifically stated otherwise. The drawings are depicted schematically and do not necessarily reflect actual objects. The features and components that exhibit the same effects are denoted by the same reference symbols as appropriate, and the description thereof will not be repeated. For brevity and clarity, reference symbols may be omitted in some detailed drawings, where appropriate. The directions designated in the drawings, up, down, left, right, front, and rear, are represented by arrows denoted as U, D, L R, F, and Rr, respectively. It should be noted that the directional terms as used herein, such as up, down, left, right, front, and rear, do not determine the direction, orientation, or arrangement of the actual battery module or cells.

FIG. 1 is a cross-sectional view of a sealed battery 10.

As illustrated in FIG. 1, the sealed battery 10 includes an electrode assembly 20, a battery case 22, a positive electrode terminal 24, a first conductive path 25, a negative electrode terminal 26, a second conductive path 27, a partition 28, a first electrolyte solution 29, a second electrolyte solution 30, a current interrupt mechanism 40, and a current application line 42.

Herein, the electrode assembly 20 is what is called a battery element, which includes a positive-electrode current collecting portion and a negative-electrode current collecting portion. The specific embodiment of the electrode assembly 20 is not limited to the embodiments illustrated herein, unless specifically stated otherwise.

In this embodiment, although not shown in the drawings in detail, the electrode assembly 20 includes a positive electrode sheet 20a serving as a positive electrode element, a negative electrode sheet 20b serving as a negative electrode element, and a separator sheet 20 serving as a separator.

Each of the positive electrode sheet 20a, the separator sheet 20c, and the negative electrode sheet 22b may be a sheet material in a predetermined shape. In this case, the electrode assembly 20 may be what is called a stacked electrode assembly in which positive electrode sheets 20a and negative electrode sheets 20b are alternately stacked with separator sheets 20c interposed therebetween. In the example shown in FIG. 1, such a stacked electrode assembly 20 is illustrated as an example.

In another embodiment of the electrode assembly 20, it is possible that, for example, the electrode assembly 20 may include a positive electrode sheet, a first separator sheet, a negative electrode sheet, and a second separator sheet, each of which may be a long strip-shaped member. In this case, the electrode assembly 20 may be what is called a wound electrode assembly in which the positive electrode sheet and the negative electrode sheet are alternately stacked and wound with the first separator sheet and the second separator sheet interposed therebetween.

Here, the positive electrode sheet 20a preferably includes a positive electrode current collector foil (for example, an aluminum foil), a positive electrode active material layer containing a positive electrode active material, and an uncoated portion defined with a constant width along one lateral edge of the positive electrode current collector foil. The positive electrode active material layer is preferably formed on both faces of the positive electrode current collector foil, except for the uncoated portion. The uncoated portion of the positive electrode current collector foil, on which the positive electrode active material layer is not formed, may serve as a positive-electrode current collecting portion 20a1 of the positive electrode sheet 20a. In a lithium-ion secondary battery, the positive electrode active material is a material that releases lithium ions during charge and absorbs lithium ions during discharge, such as lithium-transition metal composite material. Generally, other than the lithium-transition metal composite material, various materials have been proposed for use as the positive electrode active material, and the positive electrode active material is not limited to a particular material.

The negative electrode sheet 20b includes a negative electrode current collector foil (for example, a copper foil), a negative electrode active material layer containing a negative electrode active material, and an uncoated portion defined with a constant width along one lateral edge of the negative electrode current collector foil. The negative electrode active material layer is formed on both faces of the negative electrode current collector foil, except for the uncoated portion. The uncoated portion of the negative electrode current collector foil, on which the negative electrode active material layer is not formed, may serve as a negative-electrode current collecting portion 20b1 of the negative electrode sheet 20b. In a lithium-ion secondary battery, for example, the negative electrode active material is a material that absorbs lithium ions during charge and releases the absorbed lithium ions during discharge, such as graphite. Generally, other than graphite, various materials have been proposed for use as the negative electrode active material, and the negative electrode active material is not limited to a particular material.

The separator sheet 20c may be formed of, for example, an electrolyte-permeable porous resin sheet that achieves desired heat resistance. Various proposals have been made about the separator sheet 20c, and there is no particular restriction on the separator sheet 20c. It may be preferable that the negative electrode active material layer of the negative electrode sheet 20b cover the positive electrode active material layer of the positive electrode sheet 20a with the separator sheet 20c interposed between the negative electrode active material layer and the positive electrode active material layer. It may also be preferable that the separator sheet 20c cover the positive electrode active material layer of the positive electrode sheet 20a and the negative electrode active material layer of the negative electrode sheet 20b.

The uncoated portion serving as the positive-electrode current collecting portion 20a1 and the uncoated portion as the negative-electrode current collecting portion 20b1 are oriented so as to protrude laterally in opposite directions. The uncoated portion serving as the positive-electrode current collecting portion 20a1 protrudes from one of the lateral edges of the separator sheet 20c. The uncoated portion serving as the negative-electrode current collecting portion 20b1 protrudes from the other one of the lateral edges of the separator sheet 20c.

As illustrated in FIG. 1, the electrode assembly 20 as described above is enclosed in the battery case 22. In this embodiment, the battery case 22 has a flat prismatic housing region. The battery case 22 includes a case main body 22a and a lid 22b. The battery case 22 may be made of aluminum or aluminum alloy, such as 1000 series aluminum alloy or 3000 series aluminum alloy. In this embodiment, the case main body 22a has a substantially flat rectangular parallelepiped shape, and it has an opening in one face thereof that has longer sides and shorter sides. The lid 22b is a plate-shaped member that has a shape corresponding to the opening of the case main body 22a so as to be fitted to the opening.

The positive electrode terminal 24 is attached to the battery case 22.

The first conductive path 25 electrically connects the positive-electrode current collecting portion 20a1 and the positive electrode terminal 24.

In this embodiment, the positive electrode terminal 24 is attached to the lid 22b of the battery case 22 with a gasket 53 interposed between them. The positive electrode terminal 24 is attached so as to penetrate a mounting hole 22b1 provided in the lid 22b. The gasket 53 is fitted to the through hole of the lid 22b to which the positive electrode terminal 24 is attached. The gasket 53 insulates the positive electrode terminal 24 from the lid 22b and also provides that portion of the battery case 22 with sufficient hermeticity.

In the embodiment shown in FIG. 1, the positive electrode terminal 24 includes a base portion 24a, a shaft portion 24b, and a connecting piece 24c. The shaft portion 24b is a shaft extending from the base portion 24a. The shaft portion 24b is inserted through the mounting hole 22b1 of the lid 22b with the gasket 53 interposed between them. The base portion 24a is fixed to the inside of the lid 22b so as to be pressed against the gasket 53. This allows the gasket 53 to provide sufficient hermeticity. The connecting piece 24c extends from the base portion 24a toward the inside of the case main body 22a. The connecting piece 24c is connected to the positive-electrode current collecting portion 20a1.

The negative electrode terminal 26 is attached to the battery case 22.

The second conductive path 27 electrically connects the negative electrode current collector 20b1 and the negative electrode terminal 26.

In this embodiment, the negative electrode terminal 26 is, for example, a pin-shaped member inserted into a through hole of the lid 22b. The negative electrode terminal 26 includes a through hole 26a for activating the current interrupt mechanism 40. One end of the second conductive path 27 is connected the negative-electrode current collecting portion 20b1 of the negative electrode sheet 20b. The second conductive path 27 is wired so as to pass through the current path 41 of the current interrupt mechanism 40 and to be in contact with the second electrolyte solution 30 enclosed in the second space 52. The details of the second conductive path 27, the current interrupt mechanism 40, and the current path 41 will be described later.

The partition 28 is disposed inside the battery case 22. The partition 28 defines a second space 52 that is independent from a first space 51 that encloses the electrode assembly 20 in the battery case 22. The partition 28 may preferably be an electrically insulative resin component, for example.

As illustrated in FIG. 1, the partition 28 may be a box-shaped member that separates the first space 51 and the second space 52. In the embodiment shown in FIG. 1, the partition 28 is fitted on the inside of the lid 22b, at a region to which the negative electrode terminal 26 is attached. The partition 28 includes a case portion 28a and a tubular portion 28b. The case portion 28a defines the second space 52. The tubular portion 28b is provided on the case portion 28a, and is inserted into a mounting hole for attaching the negative electrode terminal 26 to the lid 22b. The negative electrode terminal 26 is attached to the tubular portion 28b. The tubular portion 28b of the partition 28 electrically insulates the negative electrode terminal 26 from the lid 22b. The second conductive path 27 which connects the negative electrode current collector 20b1 and the negative electrode terminal 26, and the current application line 42 are wired to the case portion 28a.

In this embodiment, the first space 51, which encloses the electrode assembly 20, also encloses the first electrolyte solution 29. It may be preferable that the first electrolyte solution 29 contain an electrolyte required for the battery reaction between the positive electrode and the negative electrode of the electrode assembly 20, and that the first electrolyte solution 29 have desired electrochemical properties.

The battery case 22 includes an outer wall defining the first space 51. The outer wall defining the first space 51 may be provided with a safety valve 22c that is activated at a predetermined pressure, and a relief valve 22d that is activated at an activation pressure that is lower than the activation pressure of the safety valve 22c. Herein, the functions of the safety valve 22c and the relief valve 22d are as described above. For the safety valve 22c and the relief valve 22d, it is possible to employ various structures.

The second electrolyte solution 30 contains an addition agent that generates a gas by electrolysis when a predetermined voltage is applied to the second electrolyte solution 30. The second electrolyte solution 30 is enclosed in the second space 52 and is not involved in the battery reaction that takes place in the electrode assembly 20, which is disposed in the first space 51.

It is possible that the addition agent here may start a decomposition reaction to generate a gas when a predetermined voltage, which is considered as causing an overcharge event in the sealed battery 10, is applied to the second electrolyte solution 30. Herein, it is possible to use, as the addition agent, an appropriate chemical substance that can generate a gas in response to a voltage that is considered as causing an overcharge event in the sealed battery 10.

It may be preferable that the addition agent be stable at a voltage that occurs during a normal charge and discharge operation, for example, at about 4.1 V for a lithium-ion secondary battery. It may also be preferable that the addition agent generate a gas by electrolysis upon overcharge at about 4.3 V. In this case, it may be preferable that the second electrolyte solution 30 use a non-aqueous solvent that is not decomposed at, i.e., that is resistant to, a required voltage. The second electrolyte solution 30 may be, for example, a non-aqueous electrolyte solution in which Li3PF6 as a supporting salt is dissolved at a concentration of 1 mol/L in a mixed solvent of ethylene carbonate (EC) and dimethyl carbonate (DMC). It is possible to use, as the addition agent for generating a gas, a solution containing about 1 wt. % of dissolved cyclohexylbenzene or biphenyl. It may be preferable that the second electrolyte solution 30 almost fill up the inside of the second space 52. Although examples of the composition of the second electrolyte solution 30 and the addition agent for generating a gas are illustrated herein, the second electrolyte solution 30 and the addition agent are not limited to the examples illustrated herein.

It may be preferable that the addition agent be contained only in the second electrolyte solution 30 enclosed in the second space 52 within the battery case 22. In other words, the addition agent is not contained in the first electrolyte solution 29 enclosed in the first space 51 that encloses the electrode assembly 20 inside the battery case 22. This means that the addition agent is not involved in the battery reaction that takes place in the first space 51 that encloses the electrode assembly 20. Therefore, this sealed battery 10 does not cause a problem such as the resistance increase resulting from the addition agent.

The current interrupt mechanism 40 includes a partition wall defining the second space 52, and the partition wall includes a current path portion serving as a current path 41 of the sealed battery 10. The current interrupt mechanism 40 interrupts the current path 41 in response to an internal pressure of the second space 52 that is higher than a predetermined pressure. In this embodiment, the current interrupt mechanism 40 includes an electrically conductive base plate 41a, a rupture valve 41b, a retaining collar 41c. The base plate 41a is disposed in the second space 52. The base plate 41a includes a connecting piece 41d connected to the negative-electrode current collecting portion 20b1. The base plate 41a is mounted so as to close the opening of the tubular portion 28b, within the case portion 28a of the partition 28 which defines the second space 52. That is, the base plate 41a is a portion of the partition wall that defines the second space 52. In the base plate 41a, an opening 41a1 is formed so as to face the through hole 26a of the negative electrode terminal 26. A thinned portion 41a2 is provided around the opening 41a1. The rupture valve 41b is joined to the edge of the opening 41a1 so as to close the opening 41a1 at the end of base plate 41a that is opposite the through hole 26a formed in the negative electrode terminal 26. The circumferential edge portion of the rupture valve 41b is supported by the retaining collar 41c. Thus, the current path 41 includes the thinned portion 41a2 in a portion of the partition wall that defines the second space 52. The thinned portion 41a2 is configured so that the atmospheric pressure acts on a surface of the thinned portion 41a2 that is opposite the second space 52. Specifically, the rupture valve 41b is joined to the edge of the opening 41a1, which is formed in the thinned portion 41a2. The atmospheric pressure acts on the rupture valve 41b through the through hole 26a, which is formed in the negative electrode terminal 26. Through the rupture valve 41b, the atmospheric pressure acts on the surface of the thinned portion 41a2 that is opposite the second space 52.

One of the first conductive path 25 and the second conductive path 27 (the second conductive path 27 in this embodiment) passes through the current path 41 of the current interrupt mechanism 40, and is in contact with the second electrolyte solution 30 enclosed in the second space 52. In this embodiment, the second conductive path 27 that connects the negative-electrode current collecting portion 20b1 to the negative electrode terminal 26 passes through the current path 41 of the current interrupt mechanism 40, and is in contact with the second electrolyte solution 30 enclosed in the second space 52. In the embodiment shown in FIG. 1, the negative-electrode current collecting portion 20b1 and the negative electrode terminal 26 are connected so that electric current is passed to the negative electrode terminal 26 through the connecting piece 41d, which is connected to the negative-electrode current collecting portion 20b1, the base plate 41a, which constructs the current path 41 of the current interrupt mechanism 40, the rupture valve 41b, and the retaining collar 41c. The second conductive path 27 may include the connecting piece 41d, which is connected to the negative-electrode current collecting portion 20b1, the base plate 41a, which constructs the current path 41 of the current interrupt mechanism 40, the rupture valve 41b, and the retaining collar 41c.

The other one of the conductive paths (the first conductive path 25 connecting the positive-electrode current collecting portion 20a1 and the positive electrode terminal 24 in this embodiment) includes the potential application line 42 that is wired to the second electrolyte solution 30 enclosed in the second space 52. The current application line 42 applies the potential of the other conductive path 25 to the second electrolyte solution 30. Here, inside the first space 51, the current application line 42 should preferably be coated with insulation. The current application line 42 communicates with the second electrolyte solution 30 in the second space 52. Inside the second space 52, the second conductive path 27 is in contact with the second electrolyte solution 30. This allows a voltage between the positive electrode and the negative electrode to be applied to the second electrolyte solution 30 in the second space 52 through the current application line 42 and the second conductive path 27.

Thus, in this sealed battery 10, the interior space of the battery case 22 is divided by the partition 28 into the first space 51, which encloses the electrode assembly 20 in the battery case 22, and the second space 52, which is independent from the first space 51. The first space 51 encloses the first electrolyte solution 29. The second space 52 encloses the second electrolyte solution 30. The second electrolyte solution 30 contains an addition agent for generating a gas when a predetermined voltage is applied to the second electrolyte solution 30. The current interrupt mechanism 40 includes a partition wall that defines the second space 52, and a current path 41 that includes a portion of the partition wall. The current interrupt mechanism 40 interrupts the current path 41 in response to an internal pressure of the second space 52 that is higher than a predetermined pressure. In this embodiment, the second conductive path 27, which is on the negative electrode side, passes through the current path 41 of the current interrupt mechanism 40 and also is in contact with the second electrolyte solution 30 enclosed in the second space 52. The first conductive path 25, which is on the positive electrode side, is wired to the second electrolyte solution 30 in the second space 52. The first conductive path 25 includes the current application line 42 for applying the potential of the first conductive path 25 to the second electrolyte solution 30.

In this sealed battery 10, a voltage between the positive electrode and the negative electrode is applied to the second electrolyte solution 30 in the second space 52 through the current application line 42 and the second conductive path 27. The second electrolyte solution 30 contains the addition agent that generates a gas when a voltage that is considered as causing an overcharge event is applied to the second electrolyte solution 30. When the sealed battery 10 is brought into an overcharged state and the positive electrode and the negative electrode reach a potential difference at which the addition agent contained in the second electrolyte solution 30 starts to undergo a decomposition reaction, a gas is generated in the second space 52. When the gas is generated in the second space 52, the current interrupt mechanism 40 is activated according to the internal pressure of the second space 52. Specifically, in the embodiment described above, the rupture valve 41b is pressed upward by the internal pressure of the second space 52, and consequently, the thinned portion 41a2 of the base plate 41a, to which the rupture valve 41b is joined, is ruptured. Thereby, the current path 41 of the current interrupt mechanism 40 is disconnected at a point between the base plate 41a and the rupture valve 41b. Thus, the sealed battery 10 is shut down. Note that the first electrolyte solution 29, which is involved in the battery reaction, is enclosed in the first space 51, in which the electrode assembly 20 is enclosed. The first electrolyte solution 29 does not contain the addition agent that generates a gas when a voltage that is considered as causing an overcharge event is applied thereto.

As illustrated in FIG. 1, in this sealed battery 10, the outer wall of the first space 51, in which the electrode assembly 20 is enclosed, is provided with the safety valve 22c that is activated at a predetermined pressure, and the relief valve 22d that is activated at an activation pressure that is lower than that of the safety valve 22c. In this embodiment, the second space 52 is independent from the first space 51. For this reason, the relief valve 22d does not affect the activation pressure of the current interrupt mechanism 40. The current interrupt mechanism 40, which is provided in the independent second space 52, is activated appropriately when the positive electrode and the negative electrode reaches a potential difference at which the addition agent contained in the second electrolyte solution 30 undergoes a decomposition reaction.

There is a secondary advantageous effect resulting from the fact that, in this sealed battery 10, the first electrolyte solution 29 enclosed in the first space 51, in which the electrode assembly 20 is enclosed, does not contain a gas generating agent for activating the current interrupt mechanism 40. The first space 51, in which the electrode assembly 20 is enclosed, is separated from the second space 52, in which the current interrupt mechanism 40 is constructed, by the partition 28. For this reason, the battery reaction that occurs in the first space 51, which originates from the gas generating agent contained in the second electrolyte solution 30 enclosed in the second space 52, does not increase the resistance. Therefore, a low resistance is achieved by the sealed battery 10 provided with the current interrupt mechanism 40.

Figure 2:
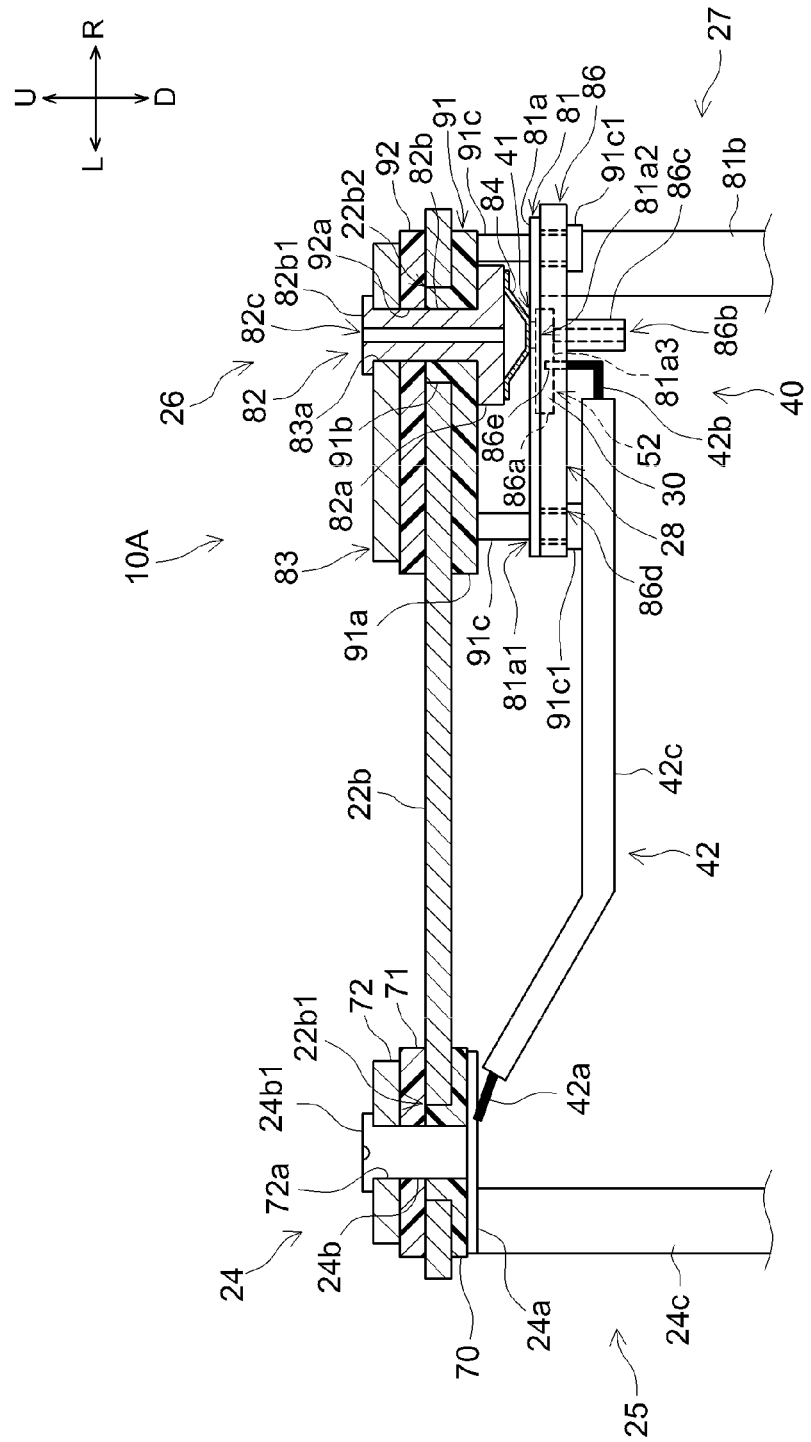
FIG. 2 is a cross-sectional view illustrating another embodiment of a partition 28 and a current interrupt mechanism 40 of a sealed battery 10A according to another embodiment of the disclosure.

FIG. 2 is a view illustrating another embodiment of the partition 28 and the current interrupt mechanism 40 of a sealed battery 10A according to another embodiment of the disclosure. In FIG. 2, the features and components that exhibit the same workings as those in the embodiment shown in FIG. 1 are denoted by the same reference symbols when appropriate.

FIG. 2 illustrates a lid 22b of a sealed battery 10A to which the partition 28 and the current interrupt mechanism 40 are fitted. The lid 22b includes a mounting hole 22b1 for mounting a positive electrode-side terminal, and a mounting hole 22b2 for mounting a negative electrode-side terminal.

In this embodiment, the positive electrode terminal 24 includes a base portion 24a, a shaft portion 24b, and a connecting piece 24c that is connected to the positive-electrode current collecting portion 20a1 (see FIG. 1). The shaft portion 24b is fitted to the mounting hole 22b1 of the lid 22b with a gasket 70 interposed between them. An insulator 71 is attached onto an outside of the lid 22b. The shaft portion 24b passes through the insulator 71 and is inserted through an attachment hole 72a in the positive electrode external terminal 72 fitted onto the insulator 71. The leading end 24b1 of the shaft portion 24b is fastened to the circumferential edge of the attachment hole 72a.

The gasket 70 and the insulator 71 are insulating members. By the gasket 70 and the insulator 71, the positive electrode terminal 24 and the positive electrode external terminal 72 are electrically insulated from the lid 22b. The gasket 70 also provides sufficient hermeticity for the mounting hole 22b1 of the lid 22b. A first end 42a of the current application line 42 is connected to the base portion 24a of the positive electrode terminal 24. The current application line 42 is covered with an insulating cover 42c.

The partition 28 and the current interrupt mechanism 40 are fitted to a location at which the negative electrode terminal 26 is mounted. Here, the negative electrode terminal 26 includes a first terminal 81, a second terminal 82, an external terminal 83, and a first insulating member 91 and a second insulating member 92, which conjointly serve as an insulating member for insulating the terminals from the lid 22. The current interrupt mechanism 40 includes a rupture valve 84. The partition 28 may also be referred to as a plate-shaped partition member 86, which includes a recess 86a formed in one side thereof. The recess 86a may serve as a second space 52.

Figure 3:
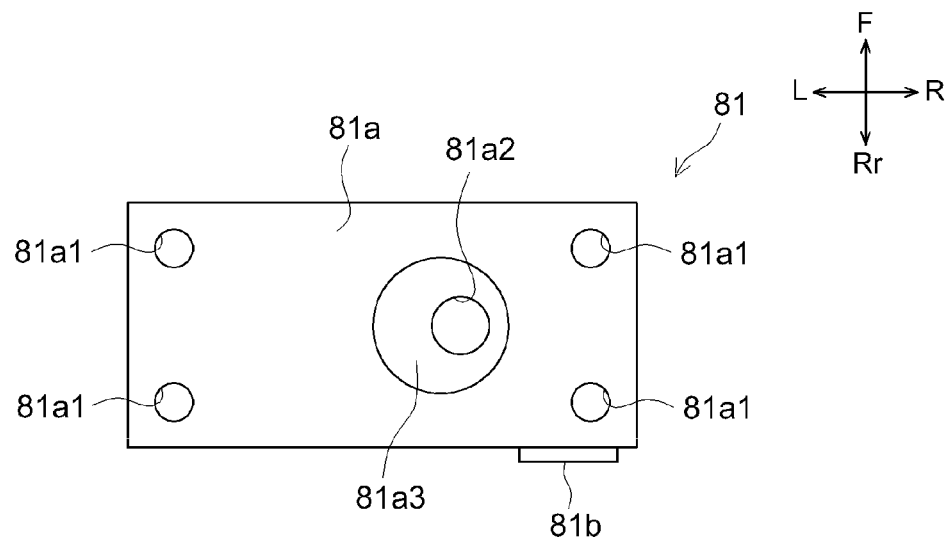
FIG. 3 is a bottom view of a first terminal 81.
Figure 4:
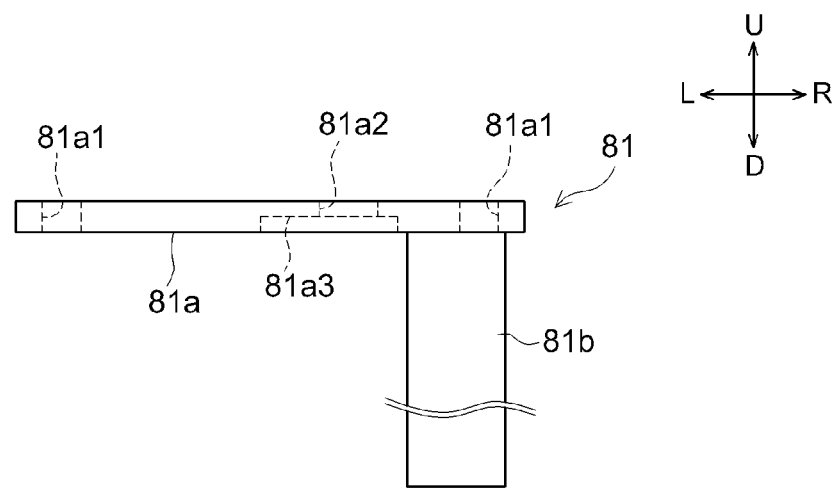
FIG. 4 is a front view of the first terminal 81.

FIG. 3 is a bottom view of the first terminal 81. FIG. 4 is a front view of the first terminal 81.

The first terminal 81 includes a base plate 81a and a connecting piece 81b. The base plate 81a is a substantially rectangular plate-shaped portion. The connecting piece 81b is a portion that is angularly bent from the base plate 81a and extends to the inside of the battery case. The connecting piece 81b is connected to the negative-electrode current collecting portion 20b1 (see FIG. 1). The base plate 81a includes mounting holes 81a1 for mounting the first insulating member 91 and the partition member 86, an opening 81a2 for connecting to the rupture valve 84 of the current interrupt mechanism 40, and a thinned portion 81a3. The mounting holes 81a1 for mounting the first insulating member 91 and the partition member 86 are formed at four corners of the base plate 81a. The thinned portion 81a3 and the opening 81a2 for connecting to the rupture valve 84 of the current interrupt mechanism 40 are formed at a position that is aligned with the position of the recess 86a formed in the partition 28.

Figure 5:
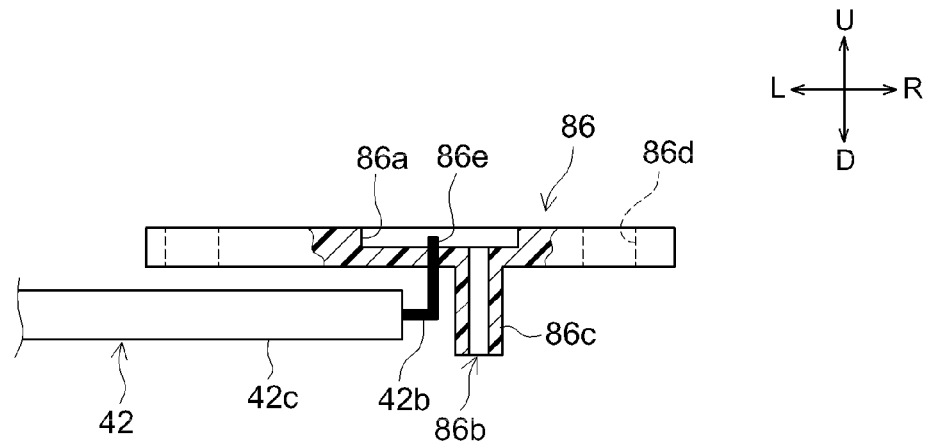
FIG. 5 is a front view of a partition member 86.

FIG. 5 is a front view of the partition member 86. FIG. 5 illustrates a cross-sectional view showing the portion in which the recess 86a and a filling port 86b are formed. FIG. 5 also shows a second end 42b of the current application line 42 that is connected to a wiring line 86e attached to the partition member 86. Here, the partition member 86 is a substantially rectangular plate-shaped member made of insulative region. The partition member 86 is stacked on the base plate 81a of the first terminal 81.

The partition member 86 includes the recess 86a, which serves as the second space 52, formed on the side on which the base plate 81a of the first terminal 81 is stacked. The recess 86a should preferably have a desired volumetric capacity that can accommodate the second electrolyte solution 30 containing the addition agent for generating a gas.

The filling port 86b for filling the second electrolyte solution 30 is provided on the other side of the partition member 86 so as to communicate with the recess 86a. In this embodiment, the filling port 86b passes through the shaft portion 86c provided on the other side of the partition member 86 that is opposite the recess 86a. In this embodiment, the second space 52 is formed by stacking the base plate 81a of the first terminal 81 on the side of the partition member 86 in which the recess 86a is formed.

At the four corners of the partition member 86, mounting holes 86d for mounting the partition member 86 to the first insulating member 91 are formed. The mounting holes 86d are formed so that their positions are aligned with the positions of the mounting holes 81a1 (see FIGS. 3 and 4), which are formed at the four corners of the base plate 81a.

As illustrated in FIG. 5, the wiring line 86e is buried in the recess 86a of the partition member 86 so as to penetrate the partition member 86 to the opposite side of the recess 86a. The wiring line 86e is connected to the second end 42b of the current application line 42.

Figure 6:
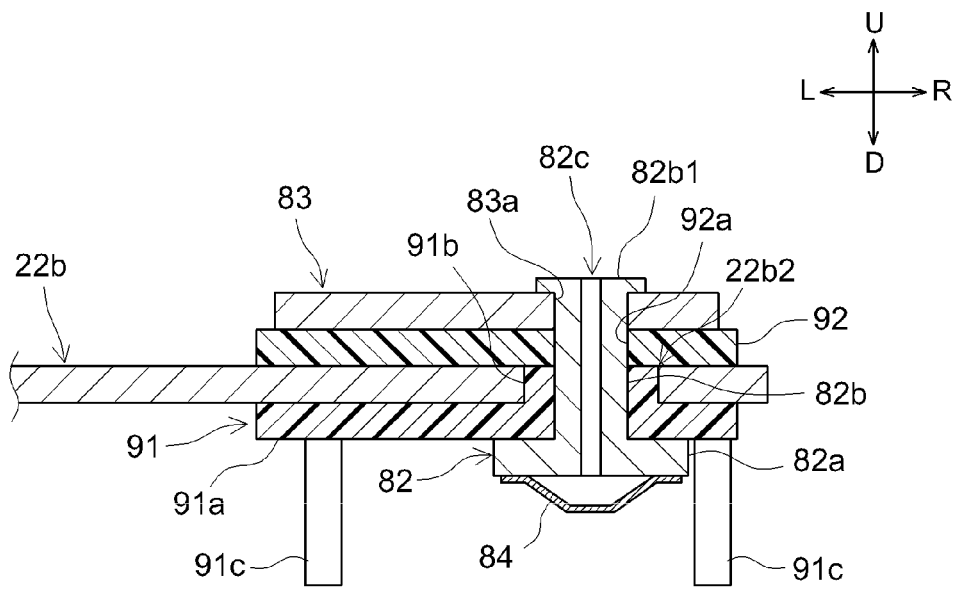
FIG. 6 is a cross-sectional view illustrating a lid 22b, to which a second terminal 82, an external terminal 83, a first insulating member 91, and a second insulating member 92 are fitted.

FIG. 6 is a cross-sectional view illustrating the lid 22b that is fitted with the second terminal 82, the external terminal 83, the first insulating member 91, and the second insulating member 92.

The second terminal 82 includes a base portion 82a, a shaft portion 82b protruding from the base portion 82a, and a through hole 82c formed so as to pass through the shaft portion 82b. The rupture valve 84 is welded to the base portion 82a of the second terminal 82 in advance.

The rupture valve 84 is a diaphragm-type valve in which the central portion is recessed. The rupture valve 84 is placed on the base portion 82a of the second terminal 82 so as to cover the through hole 82c. The entire circumferential edge portion of the rupture valve 84 is welded to the base portion 82a. Here, the rupture valve 84 covers the through hole 82c, which passes through the shaft portion 82b, in the base portion 82a of the second terminal 82. The space defined by the rupture valve 84 is in communication with the external space outside the lid 22b through the through hole 82c of the shaft portion 82b.

The first insulating member 91 is attached to the inside of the lid 22b. As illustrated in FIG. 5, the first insulating member 91 includes a base portion 91a, a tubular portion 91b, and mounting rods 91c. The base portion 91a is attached to the inner surface of the lid 22b. The tubular portion 91b protrudes from the base portion 91a, and is attached to the mounting hole 22b2 of the lid 22b. The base plate 81a of the first terminal 81 and the partition member 86 (see FIG. 2) are fitted to the mounting rods 91c.

The mounting rods 91c are provided so as to protrude from the base portion 91a, which is attached to the lid 22b. The mounting rods 91c are insertable into the mounting hole 81a1 (see FIGS. 3 and 4), which are formed at the four corners of the base plate 81a of the first terminal 81, and into the mounting holes 86d (see FIG. 5), which are formed at the four corners of the partition member 86. The mounting rods 91c are provided so that their positions are in alignment with the positions of the mounting holes 81a1 and the mounting holes 86d.

As illustrated in FIG. 6, the shaft portion 82b of the second terminal 82 is fitted into the tubular portion 91b of the first insulating member 91. Then, the tubular portion 91b fitted with the shaft portion 82b of the second terminal 82 is fitted into the mounting hole 22b2 from the inside of the lid 22b. In this case, the shaft portion 82b of the second terminal 82 protrudes outward from the lid 22b.

As illustrated in FIG. 6, the second insulating member 92 is attached to the outside of the lid 22b. The second insulating member 92 is a substantially rectangular plate-shaped member. The second insulating member 92 includes an attachment hole 92a to allow the second insulating member 92 to be attached to the shaft portion 82b of the second terminal 82, which protrudes outward from the lid 22b. The second insulating member 92 is fitted to the outside of the lid 22b with the attachment hole 92a being fitted onto the shaft portion 82b of the second terminal 82. The shaft portion 82b of the second terminal 82 protrudes outward also from the attachment hole 92a of the second insulating member 92, which is fitted on the outside of the lid 22b.

The external terminal 83 is further stacked over the second insulating member 92. The external terminal 83 includes an attachment hole 83a to allow the external terminal 83 to be attached to the shaft portion 82b of the second terminal 82 that protrudes outward from the attachment hole 92a of the second insulating member 92. The attachment hole 83a is fitted to the shaft portion 82b of the second terminal 82 that protrudes from the attachment hole 92a of the second insulating member 92. The external terminal 83 is mounted on the second insulating member 92, which is mounted on the outside of the lid 22b.

In this way, the second insulating member 92 and the external terminal 83 are stacked on the outside of the lid 22b in that order so that they are fitted to a portion of the shaft portion 82b of the second terminal 82 that protrudes outward from the lid 22b.

Under this condition, the leading end 82b1 of the shaft portion 82b of the second terminal 82, which protrudes outward from the attachment hole 83a of the external terminal 83, is fastened.

Figure 7:
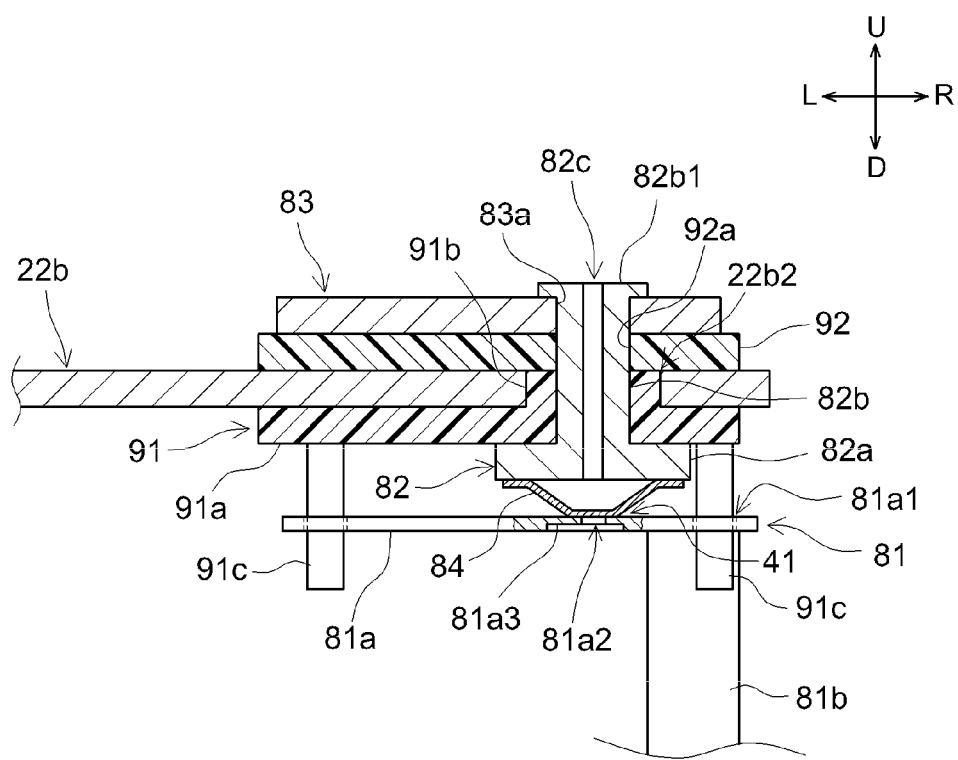
FIG. 7 is a cross-sectional view illustrating the first terminal 81 fitted to the lid 22b.

FIG. 7 is a cross-sectional view illustrating the first terminal 81 fitted to the lid 22b. As illustrated in FIG. 7, when attaching the first terminal 81 to the lid 22b, mounting holes 81a1 (see FIGS. 3 and 4), which are formed at the four corners of the base plate 81a of the first terminal 81, are fitted onto the mounting rods 91c of the first insulating member 91, which are provided inside the lid 22b. Then, the opening 81a2 formed in the thinned portion 81a3 of the first terminal 81 is put against the lower surface of the rupture valve 84 attached to the base portion 82a of the second terminal 82. Under this condition, the lower surface of the rupture valve 84 is welded to the peripheral edge of the opening 81a2, which is formed in the thinned portion 81a3 of the first terminal 81.

Under this condition, further as illustrated in FIG. 2, the partition member 86 is attached to the base plate 81a of the first terminal 81 so that the recess 86a, which may serve as the second space 52, is oriented to face the base plate 81a of the first terminal 81. At this time, the mounting rods 91c of the first insulating member 91 are inserted respectively into the mounting holes 86d, which are formed at the four corners of the partition member 86. Then, as illustrated in FIG. 2, the partition member 86 is put against the base portion 82a of the first terminal 81. Under this condition, the leading ends 91c1 of the mounting rods 91c of the first insulating member 91 are fused to fasten the mounting rods 91c onto the mounting holes 86d of the partition member 86. As a result, the second space 52 that is formed by the recess 86a of the partition member 86 and the base plate 81a of the first terminal 81 is kept in a closed space.

Although not shown in the drawings, it is also possible that a sealing member, such as an O-ring, may be attached around the recess 86a between the partition member 86 and the first terminal 81. The sealing member may ensure hermeticity of the second space 52 formed by the recess 86a. It is also possible that the partition member 86 and the first terminal 81 may be bonded together with an adhesive agent. It is also possible that the partition member 86 and the first terminal 81 may be formed integrally with each other.

Next, as illustrated in FIG. 2, the lid 22b is flipped upside down with the partition member 86 attached to the base plate 81a of the first terminal 81. The second space 52 is in communication with the filling port 86b, which penetrates the shaft portion 86c of the partition member 86. Through the filling port 86b, the second electrolyte solution 30 containing a gas-generating addition agent is filled into the recess 86a of the partition member 86. After the second electrolyte solution 30 is filled into the second space 52 sufficiently, the filling port 86b of the partition member 86 is closed. Although not shown in the drawings, it may be preferable that, for example, the filling port 86b be closed by fusing and pressing a tip end of the shaft portion 86c.

The drawings herein do not show the sealed battery 10 fitted with the assembly of the lid 22b shown in FIG. 2. The description will be given herein with reference to FIG. 1 when appropriate.

The positive-electrode current collecting portion 20a1 (see FIG. 1) of the electrode assembly 20 should be welded to the connecting piece 24c of the positive electrode terminal 24 fitted to the lid 22b, and the negative-electrode current collecting portion 20b1 (see FIG. 1) should be welded to the connecting piece 81b of the first terminal 81 on the negative electrode side. Then, while the electrode assembly 20 fitted with the assembly of the lid 22b is enclosed in the battery case 22 (see FIG. 1), the lid 22b should be fitted to the battery case 22. Thus, the second conductive path 27, which connects the negative electrode current collector 20b1 to the negative electrode terminal 26, includes the connecting piece 81b of the first terminal 81, the base plate 81a, the thinned portion 81a3, the rupture valve 84, the second terminal 82, and the external terminal 83.

In this embodiment, the second space 52, which is independent from the first space 51 (see FIG. 1) enclosing the electrode assembly 20, is separated from the first space 51 by the partition member 86 and the first space 51. In other words, the partition for dividing the interior space of the battery case 22 into the first space 51 and the second space 52 includes the partition member 86 and the first terminal 81.

In this embodiment, as illustrated in FIG. 2, the positive electrode potential is applied to the second electrolyte solution 30, which is enclosed in the second space 52, via the base portion 24a of the positive electrode terminal 24, the current application line 42, and the wiring line 86e penetrating the partition member 86 and communicating with the recess 86a. The negative electrode potential is applied to the second electrolyte solution 30 via the base plate 81a of the first terminal 81 fitted on the negative electrode side. When the sealed battery 10A is brought into an overcharged state and the positive electrode and the negative electrode reach a potential difference at which the addition agent contained in the second electrolyte solution 30 starts to undergo a decomposition reaction, a gas is generated in the second space 52.

When the gas is generated in the second space 52, the current interrupt mechanism 40 is activated according to the internal pressure of the second space 52. Specifically, in the embodiment described above, the rupture valve 84 is pressed upward by the internal pressure of the second space 52, and consequently, the thinned portion 81a3 of the base plate 81a of the first terminal 81, to which the rupture valve 84 is joined, is ruptured. Thereby, the current path 41 of the current interrupt mechanism 40 is disconnected at a point between the rupture valve 84 and the base plate 81a of the first terminal 81. Thus, the sealed battery 10A is shut down.

In the embodiment shown in FIG. 2 as well, the base plate 81a of the first terminal 81 is a portion of the partition wall that defines the second space 52. The current interrupt mechanism 40 includes the current path 41 in a portion of the partition wall that defines the second space 52, i.e., in the base plate 81a of the first terminal 81. In response to an internal pressure of the second space 52 that is higher than a predetermined pressure, the current path 41 is ruptured and interrupted. The current path 41 includes the thinned portion 81a3 in a portion of the partition wall that defines the second space 52. The thinned portion 81a3 is configured so that the atmospheric pressure acts on a surface of the thinned portion 81a3 that is opposite the second space 52. Specifically, the rupture valve 84 is joined to the edge of the opening 81a2, which is formed in the thinned portion 81a3. The atmospheric pressure acts on the rupture valve 84 through the through hole 82c, which is formed in the second terminal 82. Through the rupture valve 84, the atmospheric pressure acts on the surface of the thinned portion 81a3 that is opposite the second space 52.

As described above, the second space 52 may be formed in the recess 86a of the plate-shaped partition member 86, as illustrated in FIG. 2. This serves to reduce the space occupied by the second space 52. Reducing the space occupied by the second space 52 makes it possible to reduce the amounts of second electrolyte solution and addition agent to be used.

Various embodiments of the sealed battery have been described hereinabove according the present disclosure. Unless specifically stated otherwise, the embodiments of the battery and the method of manufacturing the battery described herein do not limit the scope of the present invention.

For example, unless otherwise stated, the structure of the battery case and that of the electrode assembly are not limited to those described in the foregoing embodiments. In addition, in the embodiment shown in FIG. 1, the first conductive path 25 is formed on the positive electrode side while the second conductive path 27 is formed on the negative electrode side. Accordingly, the second space 52 and the current interrupt mechanism 40 are constructed on the negative electrode side so that the second conductive path 27 on the negative electrode side passes through the current path 41 of the current interrupt mechanism 40. However, this is merely an example. It is also possible that the second space 52 and the current interrupt mechanism 40 are constructed on the positive electrode side so that the first conductive path 25 on the positive electrode side passes through the current path 41 of the current interrupt mechanism 40.

What is claimed is:

1. A sealed battery comprising:
an electrode assembly including a positive-electrode current collecting portion and a negative-electrode current collecting portion;
a battery case enclosing the electrode assembly;
a positive electrode terminal attached to the battery case;
a first conductive path connecting the positive-electrode current collecting portion and the positive electrode terminal;
a negative electrode terminal attached to the battery case;
a second conductive path connecting the negative-electrode current collecting portion and the negative electrode terminal;
a partition disposed in the battery case and dividing an interior space of the battery case into a first space enclosing the electrode assembly and a second space being independent from the first space, wherein the partition comprises a partition wall defining the second space, wherein the partition is a separate structure from the electrode assembly;
a first electrolyte solution enclosed in the first space;
a second electrolyte solution enclosed in the second space and containing an addition agent generating a gas when a predetermined voltage is applied to the second electrolyte solution; and
a current interrupt mechanism including the partition wall defining the second space, the partition wall including a current path portion serving as a current path of the sealed battery, the current interrupt mechanism interrupting the current path in response to an internal pressure of the second space that is higher than a predetermined pressure; wherein:
one of the first conductive path and the second conductive path passes through the current path of the current interrupt mechanism, and is in contact with the second electrolyte solution enclosed in the second space; and
the other one of the conductive paths includes a current application line that is wired to the second electrolyte solution of the second space.

2. The sealed battery according to claim 1, wherein the current path includes a thinned portion in a portion of the partition wall defining the second space.

3. The sealed battery according to claim 2, wherein the thinned portion is configured so that atmospheric pressure acts on a surface of the thinned portion that is opposite the second space.

4. The sealed battery according to claim 1, wherein the addition agent is contained only in the second electrolyte solution enclosed in the second space within the battery case.

5. The sealed battery according to claim 1, wherein: the battery case includes an outer wall defining the first space; and the outer wall is provided with a safety valve activated at a predetermined pressure, and a relief valve activated at an activation pressure that is lower than the predetermined pressure.

6. The sealed battery according to claim 1, wherein the battery case includes a lid, and the partition is fitted on the lid at a region of the lid that is attached to the negative electrode terminal or the positive electrode terminal.

7. The sealed battery according to claim 1, wherein the current application line is disposed inside the first space, and one end of the current application line is wired to the second electrolyte solution of the second space.

8. A sealed battery comprising:
an electrode assembly including a positive-electrode current collecting portion and a negative-electrode current collecting portion;
a battery case enclosing the electrode assembly;
a positive electrode terminal attached to the battery case;
a first conductive path connecting the positive-electrode current collecting portion and the positive electrode terminal;
a negative electrode terminal attached to the battery case;
a second conductive path connecting the negative-electrode current collecting portion and the negative electrode terminal;
a partition disposed in the battery case and dividing an interior space of the battery case into a first space enclosing the electrode assembly and a second space being independent from the first space, wherein the partition is a separate structure from the electrode assembly;
a first electrolyte solution enclosed in the first space;
a second electrolyte solution enclosed in the second space and containing an addition agent generating a gas when a predetermined voltage is applied to the second electrolyte solution; and
a current interrupt mechanism including a partition wall defining the second space, the partition wall being an insulative plate above the electrode assembly and below the terminal creating a recess serving as the second space, including a current path portion serving as a current path of the sealed battery, the current interrupt mechanism interrupting the current path in response to an internal pressure of the second space that is higher than a predetermined pressure; wherein:
one of the first conductive path and the second conductive path passes through the current path of the current interrupt mechanism, and is in contact with the second electrolyte solution enclosed in the second space; and
the other one of the conductive paths includes a current application line that is wired to the second electrolyte solution of the second space.

* * * * *